(12) United States Patent
Wang et al.

(10) Patent No.: US 8,147,111 B2
(45) Date of Patent: Apr. 3, 2012

(54) LIGHT GUIDE PLATE AND BACKLIGHT MODULE

(75) Inventors: Chiung-Han Wang, Kaohsiung County (TW); Jing-Huan Liao, Taoyuan County (TW); Yu-Tsung Huang, Taipei County (TW)

(73) Assignee: Au Optronics Corporation, Hsinchu (TW)

(*) Notice: Subject to any disclaimer, the term of this patent is extended or adjusted under 35 U.S.C. 154(b) by 417 days.

(21) Appl. No.: 12/421,654

(22) Filed: Apr. 10, 2009

(65) Prior Publication Data

US 2010/0128495 A1 May 27, 2010

(30) Foreign Application Priority Data

Nov. 25, 2008 (TW) .............................. 97145560 A

(51) Int. Cl.
*F21V 7/04* (2006.01)

(52) U.S. Cl. ........ 362/615; 362/617; 362/619; 362/620; 362/626; 362/625

(58) Field of Classification Search .................. 362/615, 362/617, 619–620, 623–626; 349/65
See application file for complete search history.

(56) References Cited

U.S. PATENT DOCUMENTS

| | | | | |
|---|---|---|---|---|
| 6,074,069 A * | 6/2000 | Chao-Ching et al. | ............ | 362/26 |
| 6,123,431 A * | 9/2000 | Teragaki et al. | .............. | 362/625 |
| 7,246,933 B2 * | 7/2007 | Kunimochi | ............... | 362/620 |
| 7,354,185 B2 * | 4/2008 | Yu et al. | ....................... | 362/626 |
| 7,529,461 B1 * | 5/2009 | Chen et al. | ................... | 385/146 |
| 2004/0114342 A1 | 6/2004 | Lin et al. | | |
| 2007/0127268 A1 | 6/2007 | Chen | | |

FOREIGN PATENT DOCUMENTS

| | | |
|---|---|---|
| CN | 101051149 | 10/2007 |
| JP | H10-319242 | 12/1998 |
| TW | 546520 | 8/2003 |
| TW | 576509 | 2/2004 |
| TW | I260434 | 8/2006 |
| TW | I266093 | 11/2006 |
| TW | I275858 | 3/2007 |
| TW | M317021 | 8/2007 |
| TW | M328017 | 3/2008 |
| TW | 200916860 | 4/2009 |
| TW | 200916861 | 4/2009 |
| WO | 2007/055115 | 5/2007 |

OTHER PUBLICATIONS

"1st Office Action of China counterpart application", issued on Nov. 20, 2009, p. 1-p. 7.
"Office Action of Taiwan Counterpart Application", issued on Jan. 9, 2012, p. 1-p. 8, in which the listed references were cited.

* cited by examiner

*Primary Examiner* — Robert May
(74) *Attorney, Agent, or Firm* — Jianq Chyun IP Office

(57) ABSTRACT

A light guide plate including a body and a plurality of prism microstructures is provided. The body has a bottom surface, a light emitting surface opposite to the bottom surface, and a plurality of side surfaces. The light emitting surface has a central area and at least one peripheral area outside the central area. The prism microstructures are disposed on the light emitting surface and the bottom surface. The prism microstructure disposed on the light emitting surface includes a plurality of first prism microstructures in the central area and a plurality of second prism microstructures in the peripheral area. A top angle $\theta_2$ of the second prism microstructure is greater than a top angle $\theta_1$ of the first prism microstructure. A backlight module including the above-mentioned light guide plate is also provided.

48 Claims, 14 Drawing Sheets

410a

410b

LIGHT GUIDE PLATE AND BACKLIGHT MODULE

CROSS-REFERENCE TO RELATED APPLICATION

This application claims the priority benefit of Taiwan application serial no. 97145560, filed Nov. 25, 2008. The entirety of the above-mentioned patent application is hereby incorporated by reference herein and made a part of specification.

BACKGROUND OF THE INVENTION

1. Field of the Invention

The present invention is related to a light guide plate and a backlight module, and particularly to a light guide plate having prism microstructures on two opposite surfaces thereof and a backlight module including the light guide plate.

2. Description of Related Art

A liquid crystal display (LCD) mainly includes two parts, a LCD panel and a backlight module. The LCD panel provides the display function, and the backlight module is used for providing light source. Based on the structure, the backlight module may be categorized into two types, direct-type backlight module and edge-type backlight module. In the edge-type backlight module, a light guide plate is usually required. The light guide plate provides the function of mixing lights emitted from a side light source to form a uniform planar light source.

Conventionally, the light guide plate is fabricated by stencil printing, so as to form light diffusion structures. However, other techniques, such as laser machining or etching, may also be used to form light diffusion structures. The foregoing methods can provide favorable viewing angles, but bring the disadvantage of deficiency of brightness.

In addition to the aforementioned methods, a technique called "Double V" may also be utilized to fabricate the light diffusion structures for light guide plate. The "Double V" technique is to form microstructures for light diffusion effects on a light emitting surface and a bottom surface of the light guide plate, so as to achieve light mixture. Although the "Double V" technique can increase the brightness and reduces the costs of fabricating the light guide plate, the viewing angle is narrowed in comparison with light guide plates formed by stencil printing and other methods.

SUMMARY OF THE INVENTION

The present invention provides a light guide plate having favorable light emitting efficiency, wider viewing angle, and uniform light mixture.

The present invention provides a backlight module adopting the aforementioned light guide plate to generate a preferable backlight source.

The present invention provides a light guide plate including a body and a plurality of prism microstructures. The body has a bottom surface, a light emitting surface opposite to the bottom surface, and a plurality of side surfaces connected between the bottom surface and the light emitting surface. The light emitting surface has a central area and at least one peripheral area disposed thereon, and the peripheral area is located outside the central area. The prism microstructures are respectively formed on the light emitting surface and the bottom surface, wherein the prism microstructures on the light emitting surface includes a plurality of first prism microstructures and a plurality of second prism microstructures. Herein, the first prism microstructures are in the central area, and the second prism microstructures are in the peripheral area. A top angle $\theta_2$ of each of the second prism microstructures is greater than a top angle $\theta_1$ of each of the first prism microstructures.

The present invention further provides a backlight module including the aforementioned light guide plate and a light source set, wherein the light source set is located by at least one side surface of the body of the light guide plate for emitting a light to the body via the side surface.

In the present invention, prism microstructures are respectively formed on the light emitting surface and the bottom surface of the light guide plate, and the prism microstructures on the light emitting surface are formed with different top angles, so as to achieve high light emitting efficiency and wide viewing angle. In addition, the height and depth of the prism microstructures on the bottom surface of the light guide plate are varied in correspondence to different areas of the light emitting surface, so as to overcome the problem that certain areas of the light emitting surface, in which prism microstructures having larger top angles are disposed, have lower light emitting efficiency. Thereby, the backlight module adopting the light guide plate provides better backlight source to further improve the display quality of the LCD.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
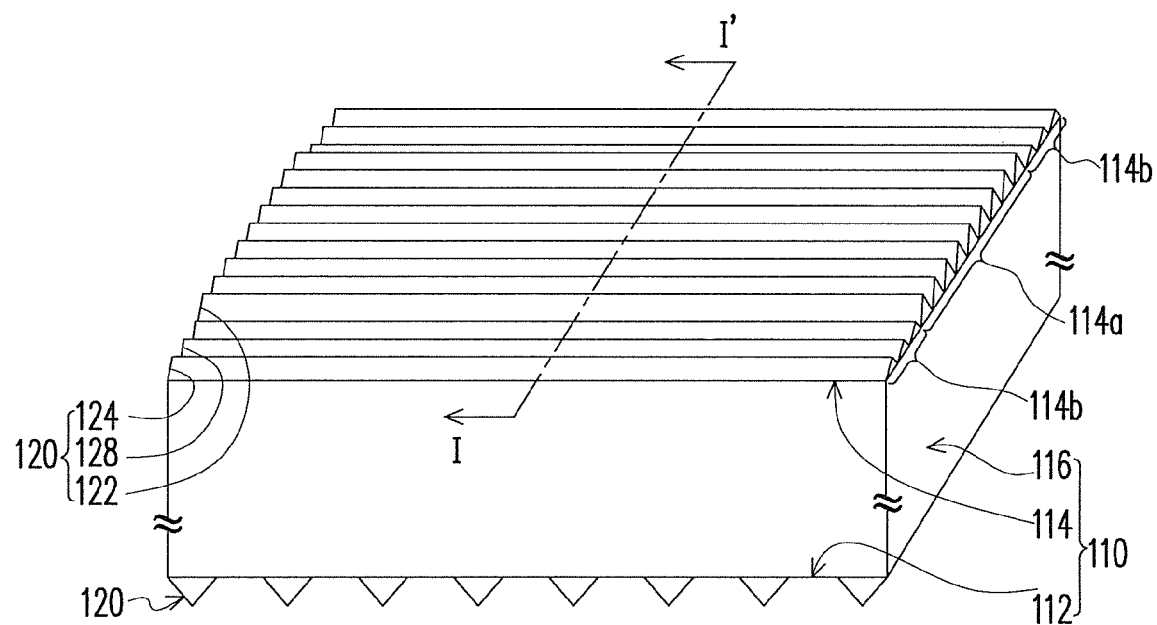
FIG. 1A is a schematic view of a light guide plate according to one embodiment of the present invention.
Figure 1B:
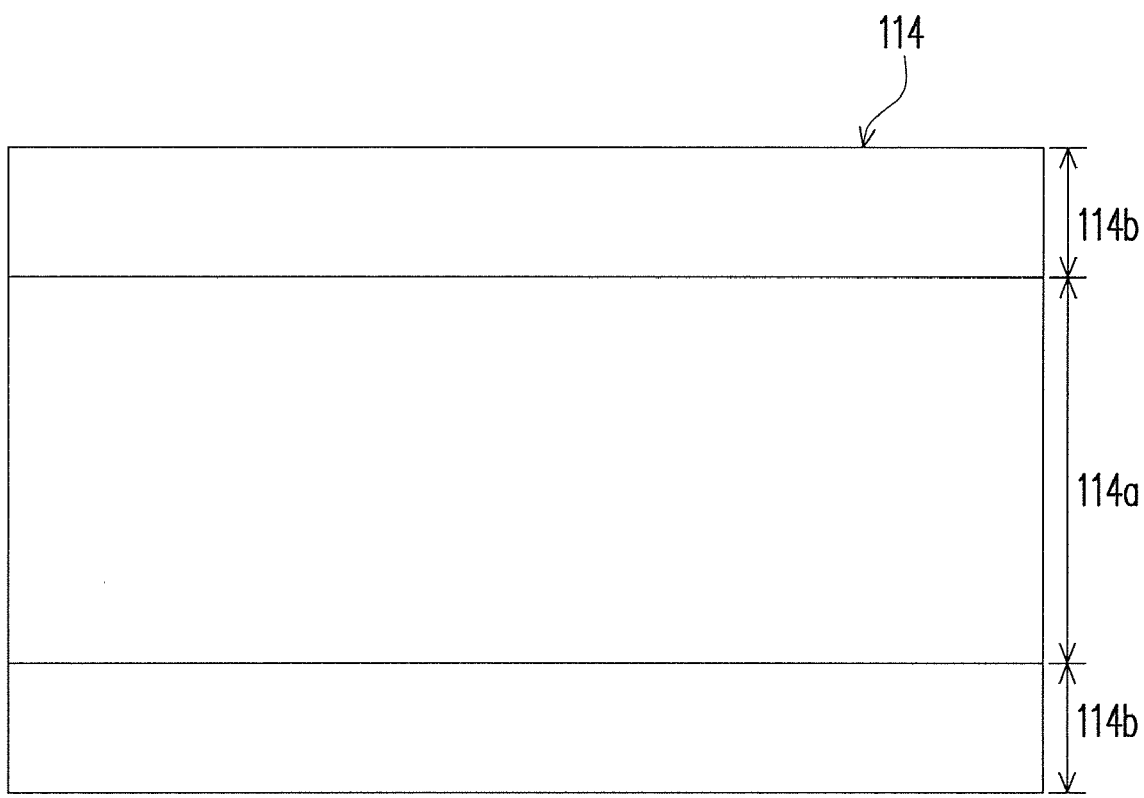
FIG. 1B is a top view of a light emitting surface of the light guide plate in FIG. 1A.
Figure 1C:
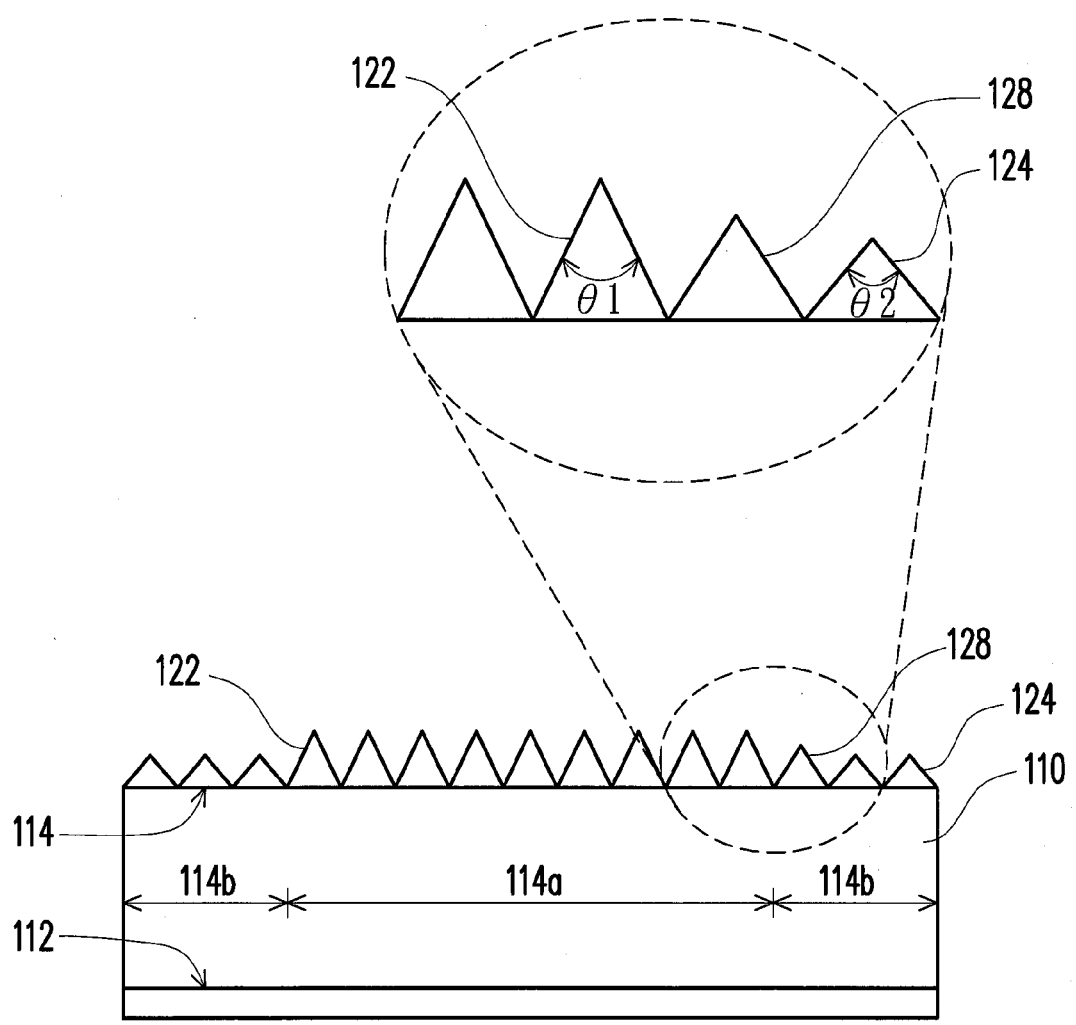
FIG. 1C is a schematic side view of the prism microstructures of the light guide plate in FIG. 1A.

FIG. 1A is a schematic view of a light guide plate according to one embodiment of the present invention. FIG. 1B is a top view of a light emitting surface of the light guide plate in FIG. 1A. FIG. 1C is a schematic side view of the prism microstructures of the light guide plate in FIG. 1A. Referring to FIG. 1A, a light guide plate 100 of this embodiment includes a body 110 and a plurality of prism microstructures 120. The body 110 has a bottom surface 112, a light emitting surface 114 opposite to the bottom surface 112, and a plurality of side surfaces 116 connected between the bottom surface 112 and the light emitting surface 114. In this embodiment, as shown in FIG. 1A, the prism microstructures 120 on the bottom surface 112 may be arranged separately or sequentially, which is variable according to actual requirements. With reference to FIG. 1B, the light emitting surface 114 includes a central area 114a and at least one peripheral area 114b disposed outside the central area 114a. In this embodiment, two peripheral areas 114b are illustrated, and the two peripheral areas 114b are defined to be located on edges of the light emitting surface 114. However, the central area 114a and the peripheral areas 114b of this embodiment are merely one of the examples. The present invention does not restrict the shapes, proportions, positions, and numbers of the central area 114a and the peripheral areas 114b in the light emitting surface 114.

Referring to FIG. 1A and FIG. 1C again, the prism microstructures 120 are disposed on the light emitting surface 114 and the bottom surface 112, wherein the prism microstructures 120 on the light emitting surface 114 may comprise a plurality of first prism microstructures 122 and a plurality of second prism microstructures 124, which have different forms. The first prism microstructures 122 are located in the central area 114a, and the second prism microstructures 124 are located in the peripheral areas 114b. Further, a top angle $\theta_2$ of each of the second prism microstructures 124 is greater than a top angle $\theta_1$ of each of the first prism microstructures 122. In this embodiment, a width of each bottom of the first prism microstructures 122 is substantially equal to a width of each bottom of the second prism microstructures 124. In other embodiments of the present invention, a height of each of the first prism microstructures 122 is substantially equal to a height of each of the second prism microstructures 124. However, the first prism microstructures 122 and the second prism microstructures 124 as described in this embodiment are merely one of the examples. The present invention does not restrict the numbers, sizes, and distribution proportions of the prism microstructures on the light emitting surface.

That is, in this embodiment, the first prism microstructures 122 and the second prism microstructures 124 on the light emitting surface 114 of the light guide plate 100 are formed to have different top angles, wherein the first prism microstructures 122 having small top angles provide better light emitting efficiency, and the second prism microstructures 124 having large top angles help to achieve wide viewing angle. Therefore, the first prism microstructures 122 of this embodiment are disposed in the central area 114a of the light emitting surface 114, so as to effectively enhance the overall light emitting efficiency of the light guide plate 100. Considering that the peripheral areas 114b of the light emitting surface 114 usually influence the viewing angle, the second prism microstructures 124 which are for achieving wide viewing angle are disposed in the peripheral areas 114b. Based on the above, the light guide plate 100 of this embodiment provides satisfactory light emitting efficiency and viewing angle effects by combining the prism microstructures 122 and 124 which have two different properties.

In practice, the top angle $\theta_1$ of the first prism microstructures 122 is preferably between 85 and 105 degrees. Moreover, the prism microstructures 120 on the light emitting surface 114 are, for example, a plurality of triangular prisms arranged in parallel to each other, and the prism microstructures 120 on the bottom surface 112 may also be a plurality of triangular prisms parallel to each other. In a preferable embodiment, the triangular prisms on the light emitting surface 114 are substantially perpendicular to the triangular prisms on the bottom surface 112.

In addition to the above embodiments, the top angles or arrangement of the prism microstructures on the light emitting surface of the present invention may also be varied. Further explanations are given below.

Figure 2A:
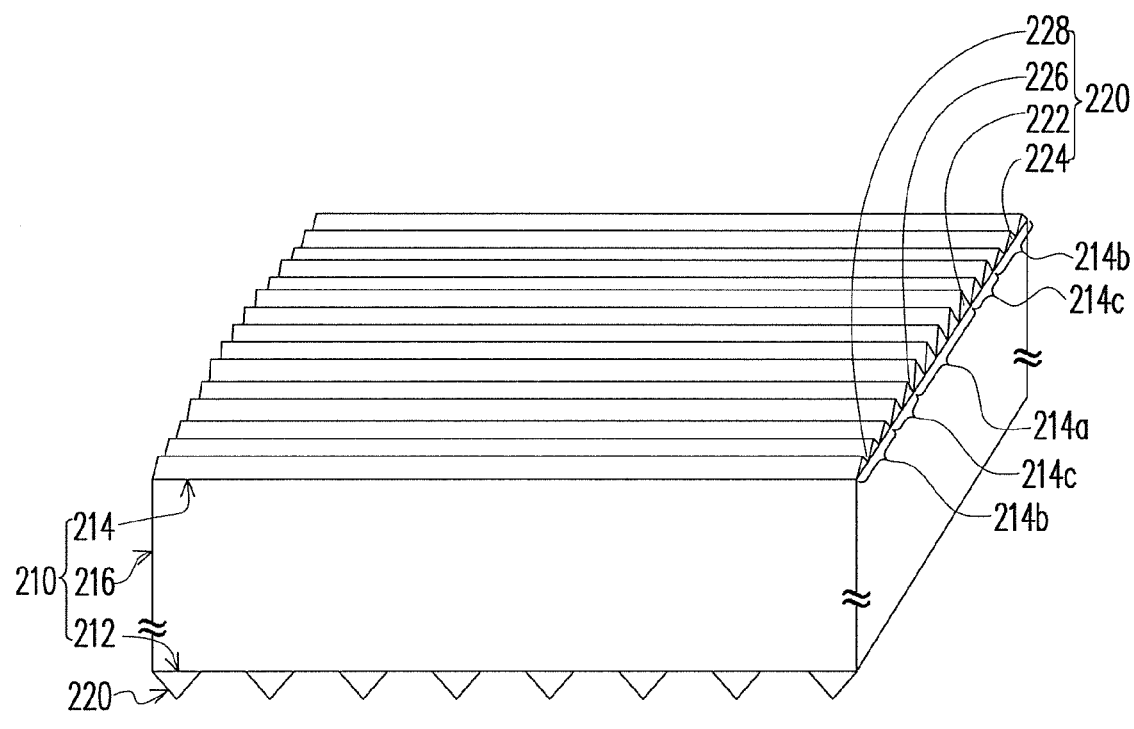
FIG. 2A is a schematic view of a light guide plate according to another embodiment of the present invention.
Figure 2B:
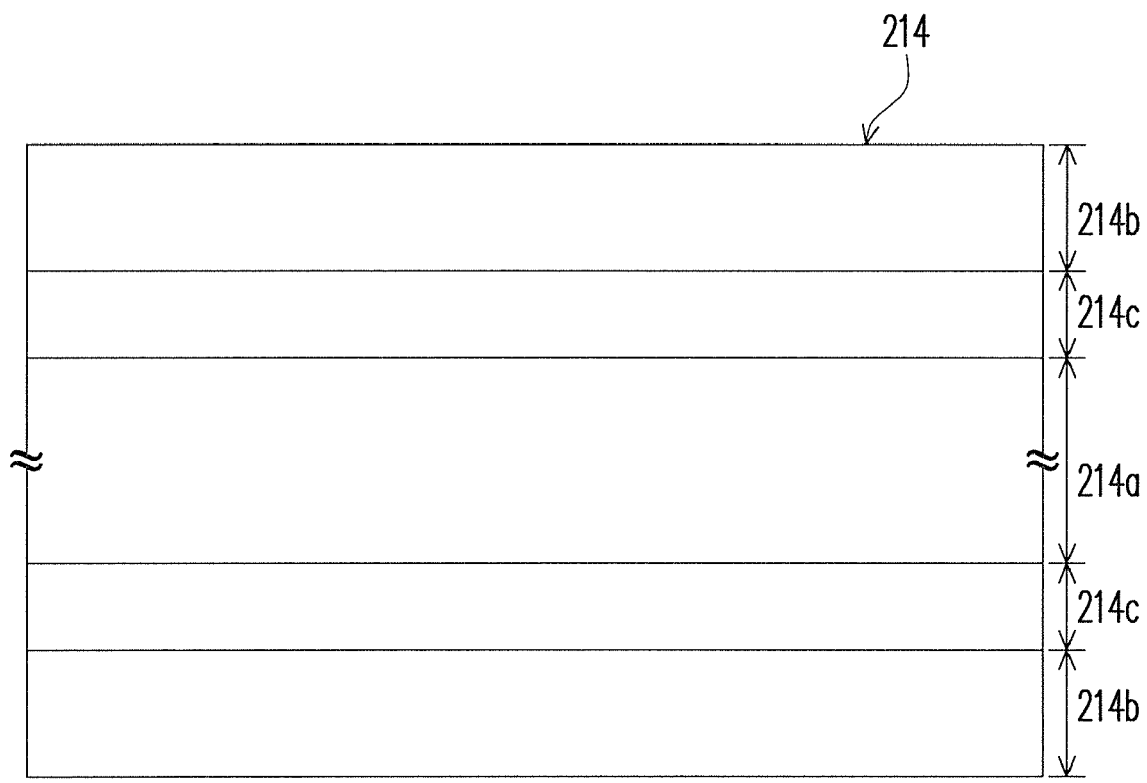
FIG. 2B is a top view of a light emitting surface of the light guide plate in FIG. 2A.
Figure 2C:
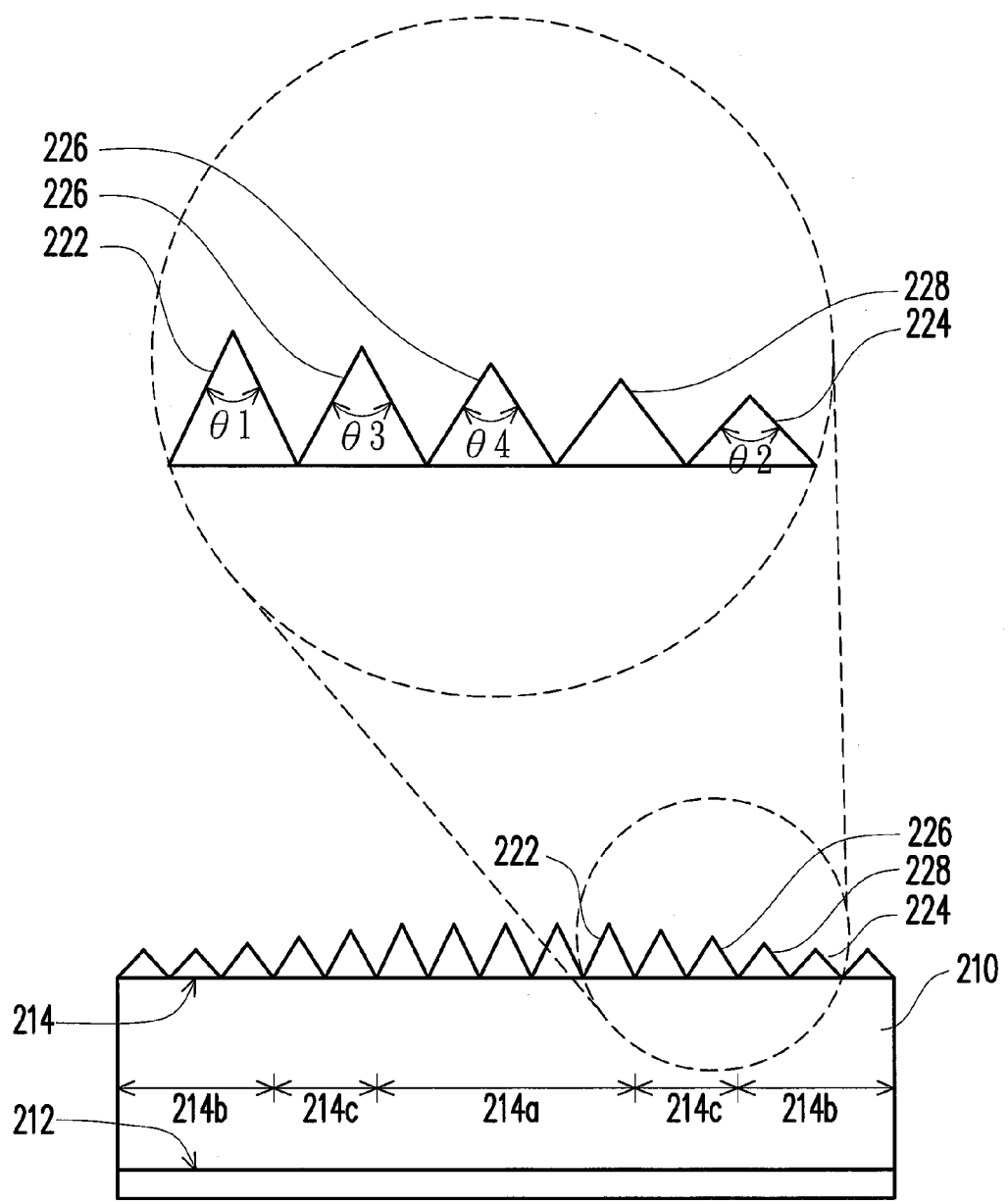
FIG. 2C is a schematic side view of the prism microstructures of the light guide plate in FIG. 2A.

FIG. 2A is a schematic view of a light guide plate according to another embodiment of the present invention. FIG. 2B is a top view of a light emitting surface of the light guide plate in FIG. 2A. FIG. 2C is a schematic side view of the prism microstructures of the light guide plate in FIG. 2A. Referring to FIG. 2A, a light guide plate 200 in this embodiment is structurally similar to the light guide plate 100 in the above embodiment, and the main difference lies in that a light emitting surface 214 of the light guide plate 200 in this embodiment may further comprise a buffer area 214c. With reference to FIG. 2B, the buffer area 214c is located between a central area 214a and a peripheral area 214b. Further, referring to FIG. 2A to FIG. 2C, the buffer area 214c has a plurality of third prism microstructures 226 disposed thereon, and a top angle of each of the third prism microstructures 226 is between a top angle $\theta_1$ of each of the first prism microstructures 222 and a top angle $\theta_2$ of each of the second prism microstructures 224. In this embodiment, as shown in FIG. 2A, the bottom widths of each first prism microstructure 222, each second prism microstructure 224, and each third prism microstructure 226 are substantially equal. In other embodiments of the present invention, the heights of the first prism microstructures 222, the second prism microstructures 224, and the third prism microstructures 226 are substantially equal. The first prism microstructures 222, the second prism microstructures 224, and the third prism microstructures 226 are merely illustrated as examples, and the present invention does not restrict the numbers, sizes, and distribution proportions of the prism microstructures on the light emitting surface.

In this embodiment, the buffer area 214c is added between the central area 214a and the peripheral area 214b to reduce boundary effects between the central area 214a and the peripheral area 214b, so that the light guide plate 200 is able to emit light more uniformly.

In addition, the prism microstructures in the buffer area 214c may also be formed by the third prism microstructures 226 having different top angles. That is to say, the third prism microstructures 226 may have various top angles. For instance, in addition to a top angle $\theta_3$, a plurality of third prism microstructures 226 having a top angle $\theta_4$ may be further disposed in the buffer area 214c, and $\theta_4$ is greater than $\theta_3$.

Furthermore, in this embodiment, a distribution density of the third prism microstructures 226 in the buffer area 214c may be varied according to the top angles thereof. For example, the distribution density of the third prism microstructures 226 having the top angle $\theta_4$ in the buffer area 214c gradually increases from the central area 214a towards the peripheral area 214b.

The aforesaid increasing distribution density of the third prism microstructures 226 having the top angle $\theta_4$ in the buffer area 214c not only helps to balance the condition of wide viewing angle in the peripheral area 214b but also avoids overly influencing the light emitting efficiency of the central area 214a. The problem of boundary is eliminated as well.

Certainly, in other embodiments, the distribution density of the third prism microstructures 226 having the smaller top angle $\theta_3$ may also be changed, so as to adjust the overall light emitting efficiency and viewing angle of the light guide plate 200.

In addition to the above, in other embodiments of the present invention, the top angles of the third prism microstructures 226 in the buffer area 214c may be varied according to different positions thereof. For instance, the top angles of the third prism microstructures 226 may be gradually increased from the central area 214a towards the peripheral area 214b, which may also improve the light emitting efficiency and enhance viewing angle effects.

It is noted that the prism microstructures in the peripheral area of the light guide plate of the present invention may also be formed to have different top angles. In view of the aforementioned embodiments, the prism microstructures in the peripheral area 114b of the light guide plate 100 in FIG. 1A or in the peripheral area 214b of the light guide plate 200 in FIG. 2A may have different top angles. That is to say, in addition to the second prism microstructures 124 and 224 having the top angle $\theta_2$, the peripheral areas 114b and 214b may, for example, respectively comprise fourth prism microstructures 128 and 228 which have a top angle between $\theta_1$ and $\theta_2$. The top angles or distribution density of the prism microstructures in the peripheral areas 114b and 214b may also be varied, as indicated above, to meet the requirements of light emitting efficiency and viewing angle. Detailed descriptions are therefore not repeated hereinafter.

Further to the above embodiments, the prism microstructures on the bottom surface of the light guide plate of the present invention may also be designed to have different heights, depths, or distribution densities. Several embodiments are further provided in the following paragraphs for describing the present invention.

Figure 3:
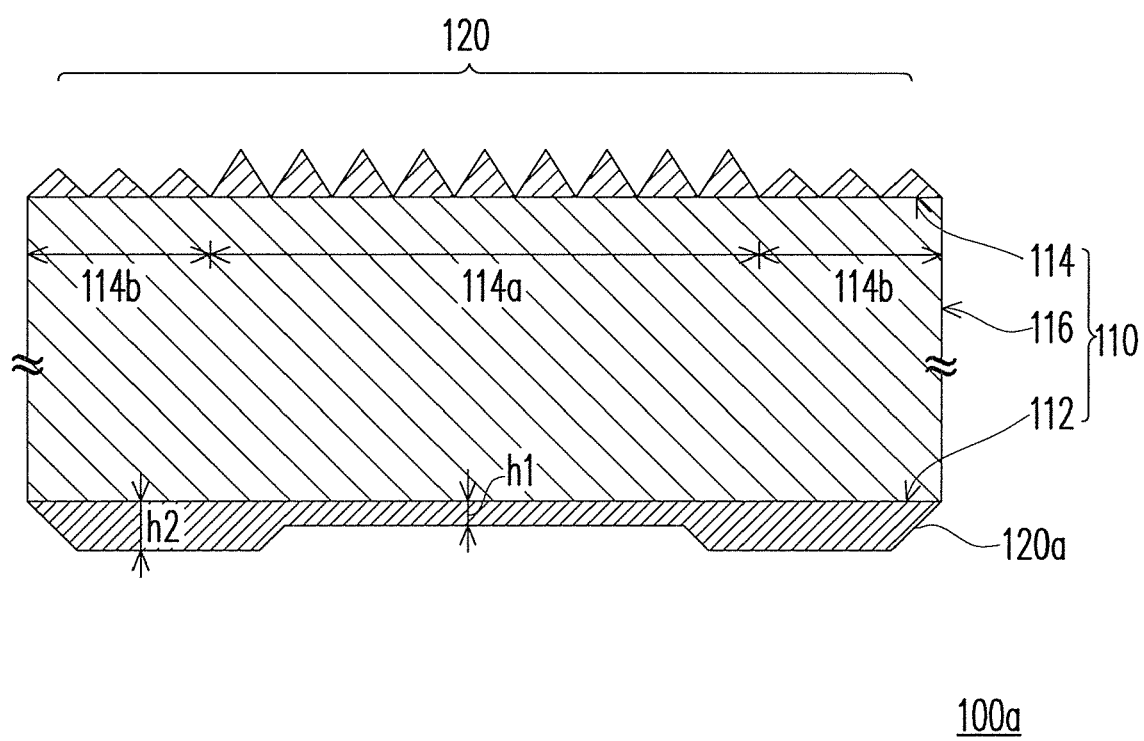
FIG. 3 is a cross-sectional view of another embodiment along Line I-I' in FIG. 1A.
Figure 4A:
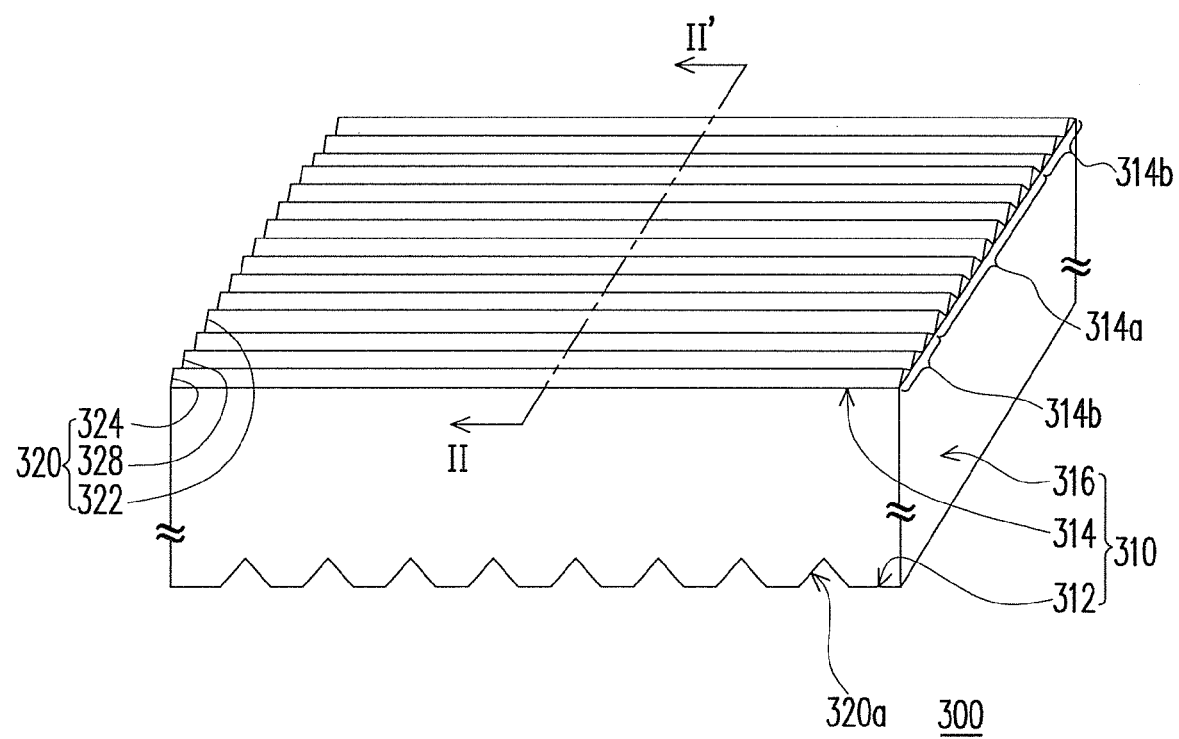
FIG. 4A is a schematic view of a light guide plate according to another embodiment of the present invention.
Figure 4B:
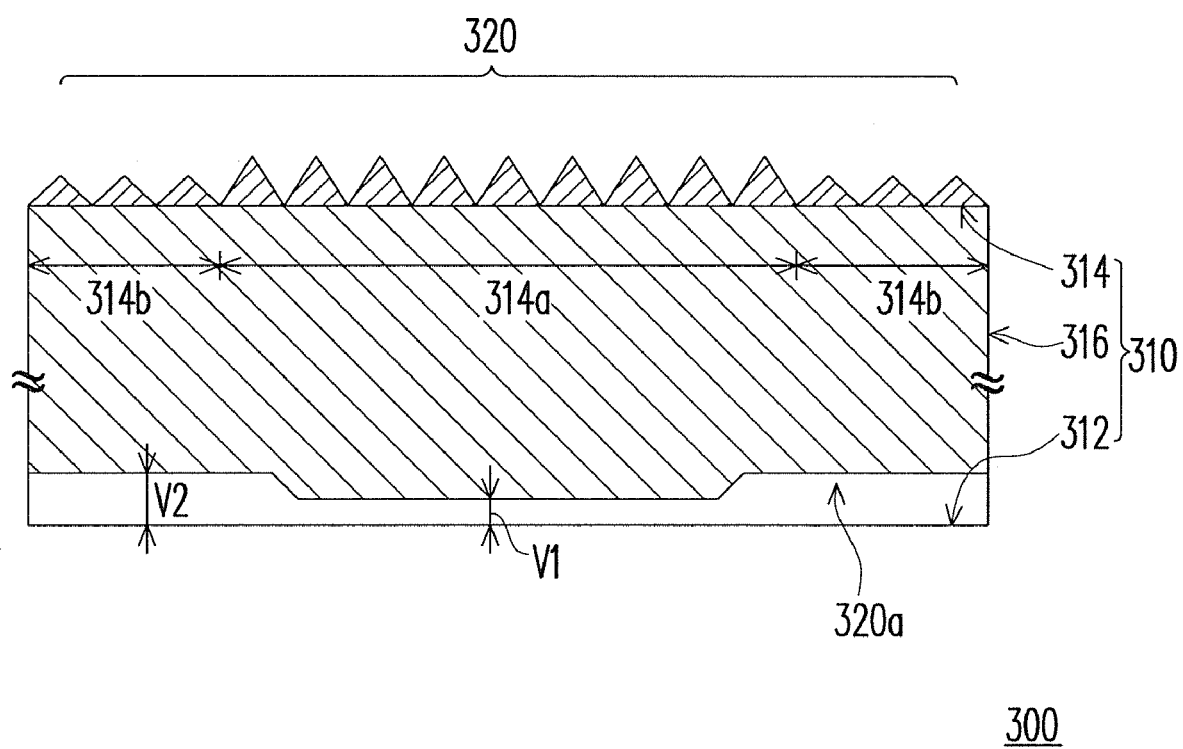
FIG. 4B is a cross-sectional view along Line II-II' in FIG. 4A.

FIG. 3 is a cross-sectional view of another embodiment along Line I-I' in FIG. 1A. FIG. 4A is a schematic view of a light guide plate according to another embodiment of the present invention. FIG. 4B is a cross-sectional view along Line II-II' in FIG. 4A. The cross-sectional views in FIG. 3 and FIG. 4B are parallel to an extending direction of the prism microstructures on the bottom surface of the light guide plate, and pass through a center of one prism microstructure on the bottom surface to clearly illustrate the height change of the prism microstructures. For simplicity and clarity, FIG. 3 and FIG. 4B do not illustrate the aforementioned various types of prism microstructures on the light emitting surface in detail. The descriptions thereof may be referred to in the above embodiment.

Referring to FIG. 3, a light guide plate 100a in this embodiment is structurally similar to the light guide plates 100 or 200 in the above embodiments. Descriptions for the similar or equivalent elements are therefore not repeated hereinafter. Likewise, the prism microstructures 120 on the bottom surface 112 of the light guide plate 100a in this embodiment are triangular prisms arranged in parallel to each other, as described in the above embodiments. A triangular prism 120a on the bottom surface 112 may be formed to have different heights. Relative to the bottom surface 112, each triangular prism 120a on the bottom surface 112, for example, has a first height $h_1$ corresponding to the central area 114a of the light emitting surface 114 and a second height $h_2$ corresponding to the peripheral area 114b of the light emitting surface 114, wherein the second height $h_2$ is greater than the first height $h_1$.

Further, with reference to FIG. 4A and FIG. 4B, a light guide plate 300 in this embodiment is structurally similar to the light guide plates 100 or 200 in the above embodiments. Descriptions for the similar or equivalent elements are therefore not repeated hereinafter. In this embodiment, it should be noted that a plurality of prism microstructures 320 on a bottom surface 312 of the light guide plate 300 are V-shaped trenches 320a which are arranged in parallel to each other, and the V-shaped trenches 320a are substantially perpendicular to the prism microstructures 320, which are formed by triangular prisms, on a light emitting surface 314. Each V-shaped trench 320a on the bottom surface 312 may be formed to have different depths. Relative to the bottom surface 312, each V-shaped trench 320a, for example, has a first depth $v_1$ corresponding to a central area 314a of the light emitting surface 314 and a second depth $v_2$ corresponding to a peripheral area 314b of the light emitting surface 314, wherein the second depth $v_2$ is greater than the first depth $v_1$.

In view of the above, the embodiments as shown in FIG. 3 and FIG. 4B are to adjust the heights of the triangular prisms 120a on the bottom surface 112 or adjust the depths of the V-shaped trenches 320a on the bottom surface 312 based on the properties of the prism microstructures on the light emitting surfaces 114 and 314, and thereby balance the condition of narrow viewing angle caused by the prism microstructures having smaller top angles in the central areas 114a and 314a. Further, the condition of lower light emitting efficiency resulting from the prism microstructures having larger top angles in the peripheral areas 114b and 314b is improved by adjusting the heights of the triangular prisms 120a on the bottom surface 112 or adjusting the depths of the V-shaped trenches 320a on the bottom surface 312.

Figure 5A:
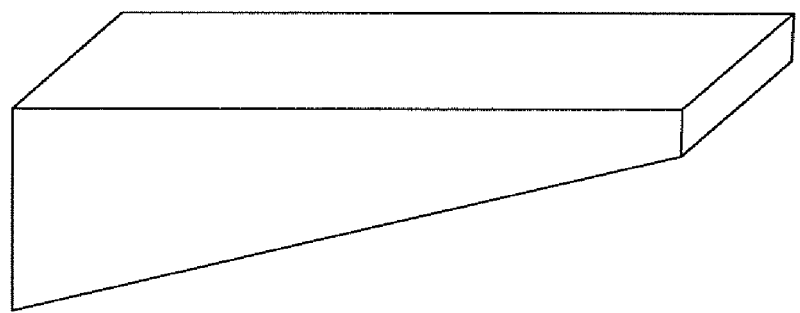
FIG. 5A and FIG. 5B illustrate two other types of a body of a light guide plate of the present invention.
Figure 5B:
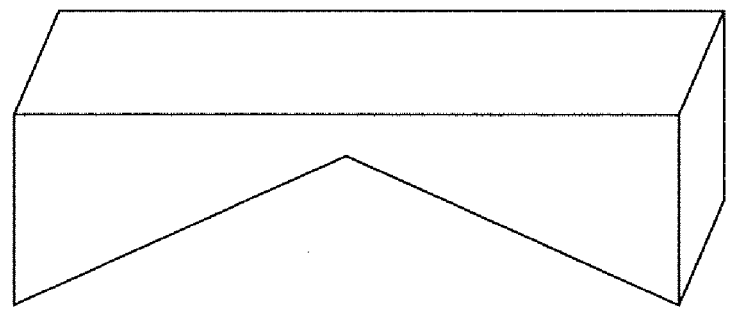

The bodies 110, 210, and 310 of the light guide plates 100, 100a, 200, and 300 as illustrated in the above embodiments are all parallel plate materials. However, in practice, different types of plate materials may also be adopted to fabricate the light guide plate of the present invention. FIG. 5A and FIG. 5B illustrate two other types of bodies 410a and 410b of the light guide plate, wherein the body 410a in FIG. 5A is a wedge, and in FIG. 5B, a thickness of the body 410b gradually decreases from outside to the center. Moreover, the prism microstructures as disclosed in the above or other embodiments may be respectively formed on the body 410a in FIG. 5A and the body 410b in FIG. 5B. Detailed descriptions of the prism microstructures may be referred to the above embodiments and therefore not repeated hereinafter.

Figure 6:
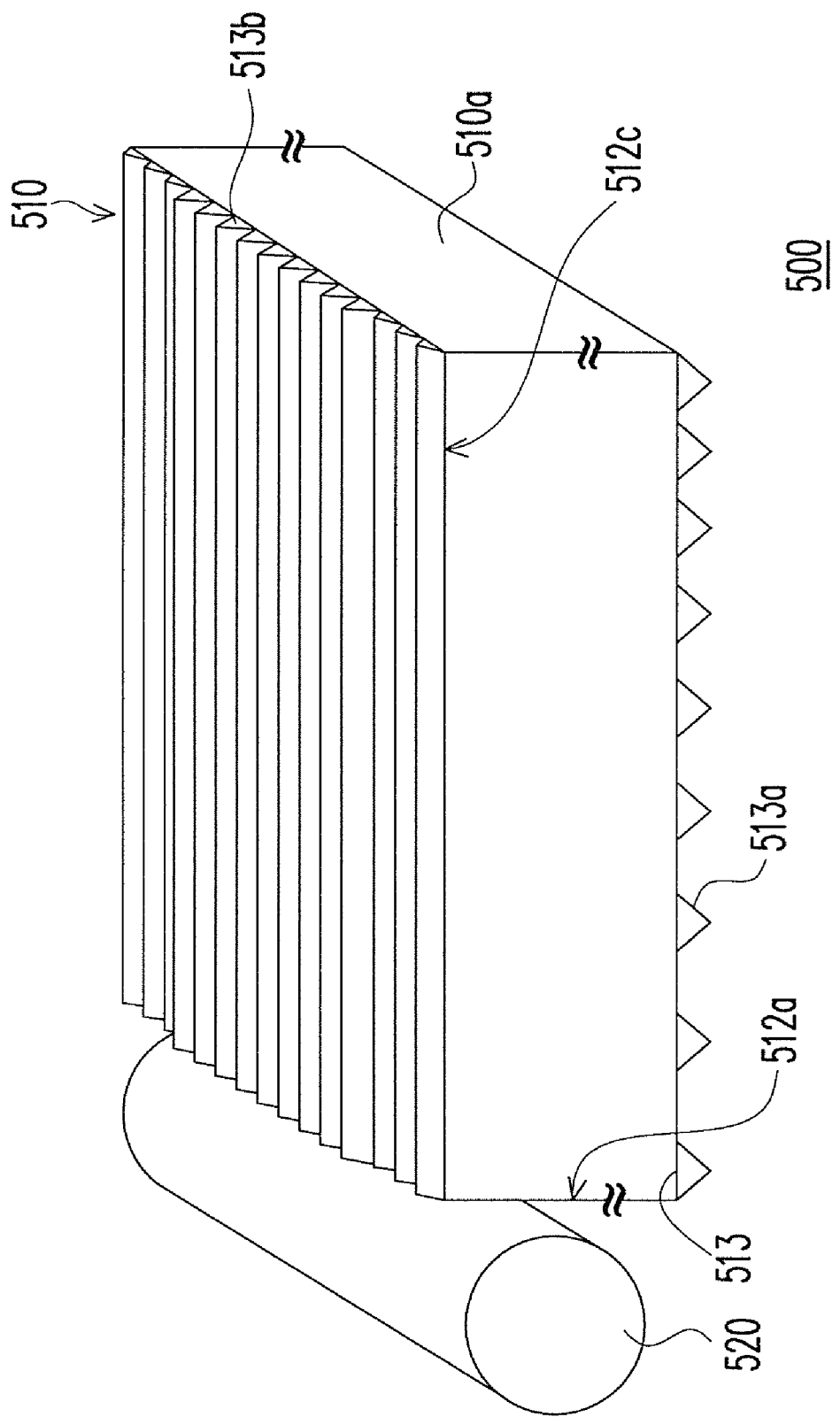
FIG. 6 is a schematic view of a backlight module according to one embodiment of the present invention.

The present invention further provides a backlight module adopting the aforementioned light guide plates. FIG. 6 is a schematic view of a backlight module according to one embodiment of the present invention. With reference to FIG. 6, a backlight module 500 of this embodiment comprises a light guide plate 510 and a light source set 520. The light guide plate 510 may be the aforementioned light guide plates 100, 100a, 200, 300, or other light guide plate structures of the present invention. For simplicity, the descriptions of similar or equivalent elements are not repeated hereinafter. Further, a side surface 512a of a body 510a of the light guide plate 510 is used as a light introducing surface, and the light source set 520 is a strip light source located by the side surface 512a. The light source set 520 is adapted for emitting a light to the light guide plate 510 via the side surface 512a. According to this embodiment, on a projection plane parallel to a light emitting surface 512c, an extending direction of the light source set 520 is substantially perpendicular to an extending direction of the prism microstructures 513b on the light emitting surface 512c. In other words, an extending direction of a normal of the side surface 512a which serves as the light introducing surface is substantially parallel to the extending direction of the prism microstructures 513b on the light emitting surface 512c.

Figure 7:
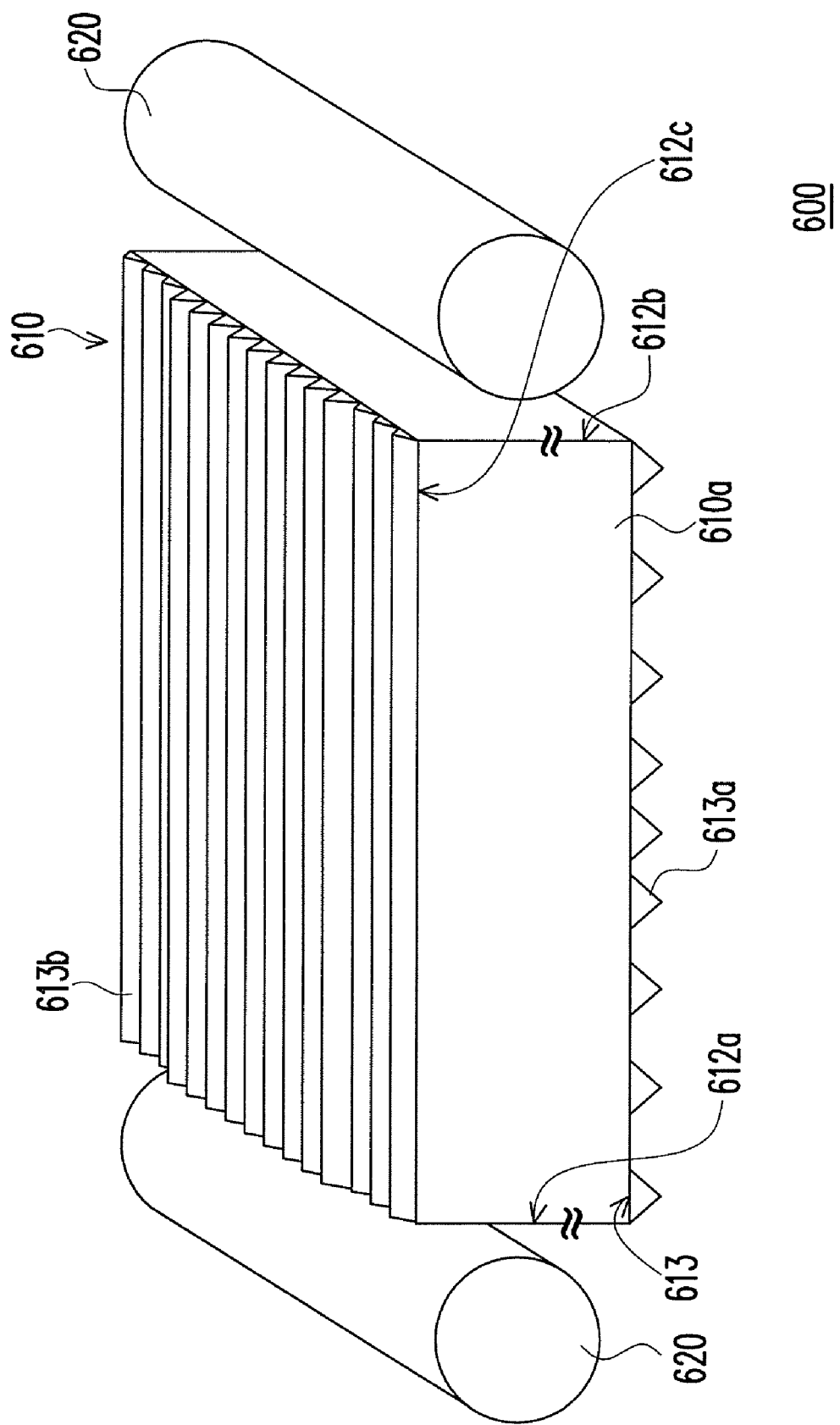
FIG. 7 is a schematic view of a backlight module according to another embodiment of the present invention.

FIG. 7 is a schematic view of a backlight module according to another embodiment of the present invention. Referring to FIG. 7, a backlight module 600 of this embodiment comprises a light guide plate 610 and a light source set 620. The light guide plate 610 may be the aforementioned light guide plates 100, 100a, 200, 300, or other light guide plate structures of the present invention. For simplicity, the descriptions of the similar or equivalent elements are not repeated hereinafter. Further, two opposite side surfaces 612a and 612b of a body 610a of the light guide plate 610 are used to serve as light introducing surfaces, and the light source set 620 includes two strip light sources respectively disposed by the two side surfaces 612a and 612b. The light source set 620 is adapted for emitting lights to the light guide plate 610 via the side surfaces 612a and 612b. In this embodiment, it should be noted that, on a projection plane parallel to a light emitting surface 612c, an extending direction of the light source set 620 is substantially perpendicular to an extending direction of the prism microstructures 613b on the light emitting surface 612c. That is to say, an extending direction of a normal of the side surface 612a or 612b which serves as the light introducing surface is substantially parallel to the extending direction of the prism microstructures 613b on the light emitting surface 612c.

In the above embodiments, light deficiency usually occurs at a point which is far away from the light source sets 520 and 620 in the light guide plates 510 and 610. Accordingly, the distribution densities of the prism microstructures 513a and 613a on the bottom surfaces 513 and 613 may be designed to increase along the directions away from the light introducing surfaces 512a, 612a, and 612b. Specifically, the prism microstructures 513a in FIG. 6 are increased along one single direction, and the prism microstructures 613a in FIG. 7 are increased from two light introducing surfaces 612a and 612b towards to the center of the light guide plate 610, so as to enhance the light emitting efficiency at any point far away from the light source sets 520 and 620.

Based on the above embodiments, it is known that the heights and depths of the prism microstructures on the bottom surfaces 513 and 613 of the light guide plates 510 and 610 or the distribution densities of other prism microstructures all influence light emitting efficiency. Accordingly, the prism microstructures may be designed based on the arrangements of the light source sets 520 and 620. For instance, the heights or depths of the prism microstructures 513a and 613a on the bottom surfaces 513 and 613 gradually increase along a direction away from the light introducing surfaces 512a, 612a, and 612b. That is to say, the microstructures on the bottom surface become more conspicuous as being away from the light source. The foregoing variation is merely one of the examples and may be adjusted according to actual requirements. In addition, the strip light sources may be fluorescent lamps, LED (light emitting diode) light bar, or other similar light sources, which may be varied according to actual requirements, and the present invention is not limited thereto.

Figure 8:
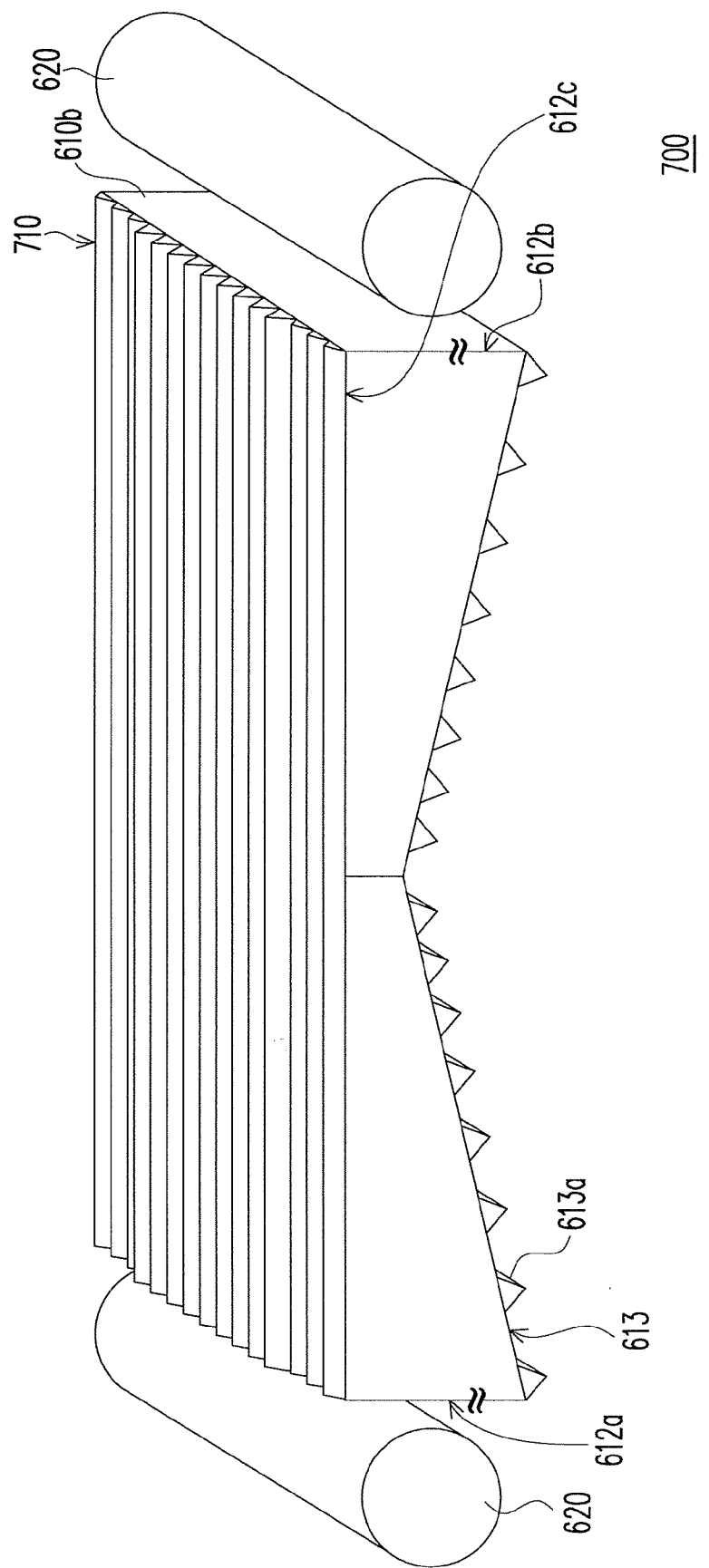
FIG. 8 is a schematic view of a backlight module according to yet another embodiment of the present invention.
Figure 9:
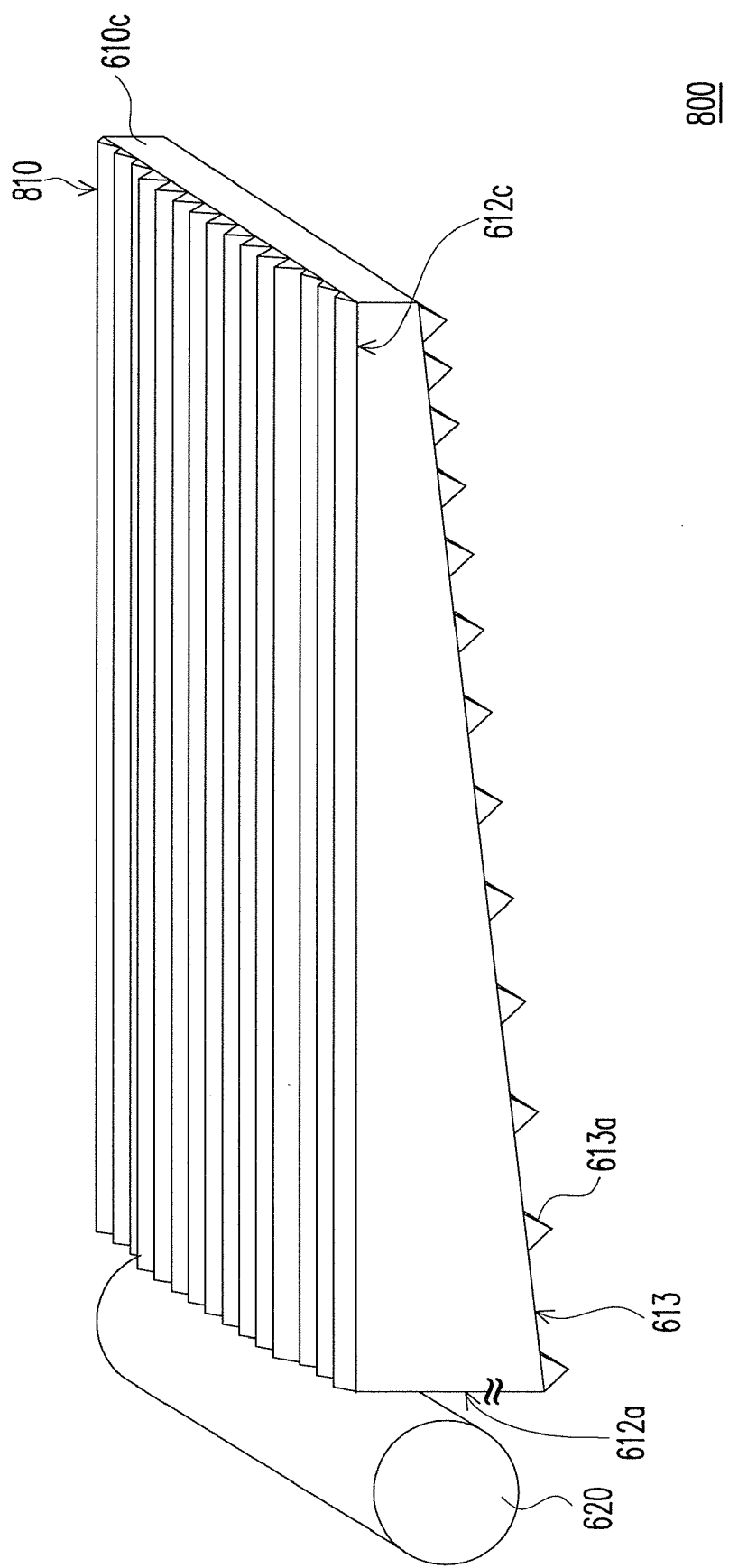
FIG. 9 is a schematic view of a backlight module according to further another embodiment of the present invention.

FIG. 8 is a schematic view of a backlight module according to yet another embodiment of the present invention. FIG. 9 is a schematic view of a backlight module according to further another embodiment of the present invention. Referring to FIG. 8 and FIG. 9, a backlight module 700 is structurally similar to the backlight module 600 in FIG. 7, and a backlight module 800 is structurally similar to the backlight module 500 in FIG. 6. The same elements are therefore indicated by the same reference numbers. The main differences between these backlight modules are the shapes of the bodies of the backlight modules 700 and 800. In FIG. 8, a thickness of a body 610b of a light guide plate 710 in the backlight module 700 gradually decreases from the outside to the center. In FIG. 9, a body 610c of a light guide plate 810 in the backlight module 800 is a wedge.

Except for the above, the backlight module 700 in FIG. 8 is the same as the backlight module 600 in FIG. 7, for the distribution density of the prism microstructures 613a on the bottom surface 613 of the backlight module 700 also gradually increases from the two light introducing surfaces 612a and 612b towards the centers of the light guide plates 710. Further, the backlight module 800 in FIG. 9 is approximately the same as the backlight module 500 in FIG. 6, for the distribution density of the prism microstructures 613a on the bottom surface 613 of the backlight module 800 also gradually increases along a direction away from the light source. Through the above distributions, the light emitting efficiency of any point far away from the light source set 620 is improved.

In conclusion, the present invention is to form prism microstructures on the light guide plate, and the light emitting surface of the light guide plate has prism microstructures of various top angles disposed thereon. Further, a buffer area may be disposed to reduce the boundary effects between the central area and the peripheral area. Moreover, the height or depth of the prism microstructures on the bottom surface of the light guide plate is varied in correspondence to different areas of the light emitting surface, so as to balance the condition that certain areas of the light emitting surface, in which prism microstructures having larger top angles are disposed, have lower light emitting efficiency. When compared with backlight modules using conventional light guide plates, the backlight module of the present invention includes prism microstructures having heights, depths, or distribution densities varied according to the arrangement of light source, and therefore provides better light emitting efficiency and achieves more uniform light mixture.

Although the present invention has been disclosed by the above embodiments, they are not intended to limit the present invention. Persons having ordinary knowledge in the art may make some modifications and variations without departing from the spirit and scope of the present invention. Therefore, the protection range of the present invention falls in the appended claims.

What is claimed is:

1. A light guide plate, comprising:
a body having a bottom surface, a light emitting surface opposite to the bottom surface, and a plurality of side surfaces connected between the bottom surface and the light emitting surface, wherein the light emitting surface has a central area and at least one peripheral area disposed thereon, and the peripheral area is located outside the central area; and
a plurality of prism microstructures disposed on the light emitting surface and the bottom surface, wherein the prism microstructures on the light emitting surface comprise a plurality of first prism microstructures located in the central area and a plurality of second prism microstructures located in the peripheral area, and a top angle $\theta_2$ of each of the second prism microstructures is greater than a top angle $\theta_1$ of each of the first prism microstructures, wherein the prism microstructures on the light emitting surface comprise a plurality of triangular prisms arranged in parallel to each other, and the prism microstructures on the bottom surface comprise a plurality of triangular prisms arranged in parallel to each other, and relative to the bottom surface, each of the triangular prisms on the bottom surface has a first height corresponding to the central area and a second height corresponding to the peripheral area, and the second height is greater than the first height.

2. The light guide plate as claimed in claim 1, wherein each adjacent two of the prism microstructures on the bottom surface are spaced from each other.

3. The light guide plate as claimed in claim 1, wherein the top angle $\theta_1$ of each of the first prism microstructures is between 85 and 105 degrees.

4. The light guide plate as claimed in claim 1, wherein the light emitting surface further has a buffer area between the central area and the peripheral area, and the prism microstructures on the light emitting surface further comprise a plurality of third prism microstructures located in the buffer area and a top angle of each of the third prism microstructures is between $\theta_1$ and $\theta_2$.

5. The light guide plate as claimed in claim 4, wherein the third prism microstructures are constituted by a plurality of prism microstructures having top angles $\theta_3$ and a plurality of prism microstructures having top angles $\theta_4$, and $\theta_4$ is greater than $\theta_3$.

6. The light guide plate as claimed in claim 5, wherein a distribution density of the prism microstructures having top angles $\theta_4$ in the buffer area gradually increases from the central area towards the peripheral area.

7. The light guide plate as claimed in claim 4, wherein the top angles of the third prism microstructures gradually increase from the central area towards the peripheral area.

8. The light guide plate as claimed in claim 1, wherein the prism microstructures on the light emitting surface further comprise a plurality of third prism microstructures located in the peripheral area, and a top angle of each of the third prism microstructures is between $\theta_1$ and $\theta_2$.

9. The light guide plate as claimed in claim 1, wherein the triangular prisms on the light emitting surface are substantially perpendicular to the triangular prisms on the bottom surface.

10. The light guide plate as claimed in claim 1, wherein at least one of the side surfaces serves as a light introducing surface, and a distribution density of the prism microstructures on the bottom surface gradually increases along a direction away from the light introducing surface.

11. The light guide plate as claimed in claim 1, wherein at least one of the side surfaces serves as a light introducing surface, and a height or depth of the prism microstructures on the bottom surface gradually increases along a direction away from the light introducing surface.

12. The light guide plate as claimed in claim 1, wherein at least one of the side surfaces serves as a light introducing surface, and an extending direction of a normal of the light introducing surface is substantially parallel to an extending direction of the prism microstructures on the light emitting surface.

13. A backlight module, comprising:
a light guide plate, comprising:
a body having a bottom surface, a light emitting surface opposite to the bottom surface, and a plurality of side surfaces connected between the bottom surface and the light emitting surface, wherein the light emitting surface has a central area and at least one peripheral area disposed thereon, and the peripheral area is located outside the central area;
a plurality of prism microstructures disposed on the light emitting surface and the bottom surface, wherein the prism microstructures on the light emitting surface comprise a plurality of first prism microstructures located in the central area and a plurality of second prism microstructures located in the peripheral area, and a top angle $\theta_2$ of each of the second prism microstructures is greater than a top angle $\theta_1$ of each of the first prism microstructures, wherein the prism microstructures on the light emitting surface comprise a plurality of triangular prisms arranged in parallel to each other, and the prism microstructures on the bottom surface comprise a plurality of triangular prisms arranged in parallel to each other, and relative to the bottom surface, the triangular prisms on the bottom surface have a first height corresponding to the central area and a second height corresponding to the peripheral area, and the second height is greater than the first height; and
a light source set located by at least one side surface of the body for emitting a light into the body via the at least one side surface.

14. The backlight module as claimed in claim 13, wherein each adjacent two of the prism microstructures on the bottom surface are spaced from each other.

15. The backlight module as claimed in claim 13, wherein, on a projection plane parallel to the light emitting surface, an extending direction of the light source set is substantially perpendicular to an extending direction of the prism microstructures on the light emitting surface.

16. The backlight module as claimed in claim 13, wherein a top angle $\theta_1$ of each of the first prism microstructures is between 85 and 105 degrees.

17. The backlight module as claimed in claim 13, wherein the light emitting surface further has a buffer area between the central area and the peripheral area, and the prism microstructures on the light emitting surface further comprise a plurality of third prism microstructures located in the buffer area and a top angle of each of the third prism microstructures is between $\theta_1$ and $\theta_2$.

18. The backlight module as claimed in claim 17, wherein the third prism microstructures are constituted by a plurality of prism microstructures having top angles $\theta_3$ and a plurality of prism microstructures having top angles $\theta_4$, and $\theta_4$ is greater than $\theta_3$.

19. The backlight module as claimed in claim 18, wherein a distribution density of the prism microstructures having top angles $\theta_4$ in the buffer area gradually increases from the central area towards the peripheral area.

20. The backlight module as claimed in claim 17, wherein the top angles of the third prism microstructures gradually increase from the central area towards the peripheral area.

21. The backlight module as claimed in claim 13, wherein the prism microstructures on the light emitting surface further comprise a plurality of third prism microstructures located in the peripheral area, and a top angle of each of the third prism microstructures is between $\theta_1$ and $\theta_2$.

22. The backlight module as claimed in claim 13,
wherein the triangular prisms on the light emitting surface are substantially perpendicular to the triangular prisms on the bottom surface.

23. The backlight module as claimed in claim 13, wherein at least one of the side surfaces serves as a light introducing surface, and a distribution density of the prism microstructures on the bottom surface gradually increases along a direction away from the light introducing surface.

24. The backlight module as claimed in claim 13, wherein at least one of the side surfaces serves as a light introducing surface, and a height or depth of the prism microstructures on the bottom surface gradually increases along a direction away from the light introducing surface.

25. A light guide plate, comprising:
   a body having a bottom surface, a light emitting surface opposite to the bottom surface, and a plurality of side surfaces connected between the bottom surface and the light emitting surface, wherein the light emitting surface has a central area and at least one peripheral area disposed thereon, and the peripheral area is located outside the central area; and
   a plurality of prism microstructures disposed on the light emitting surface and the bottom surface, wherein the prism microstructures on the light emitting surface comprise a plurality of first prism microstructures located in the central area and a plurality of second prism microstructures located in the peripheral area, and a top angle $\theta_2$ of each of the second prism microstructures is greater than a top angle $\theta_1$ of each of the first prism microstructures, wherein the prism microstructures on the light emitting surface comprise a plurality of triangular prisms arranged in parallel to each other, the prism microstructures on the bottom surface comprise a plurality of V-shaped trenches arranged in parallel to each other, and, relative to the bottom surface, each of the V-shaped trenches on the bottom surface has a first depth corresponding to the central area and a second depth corresponding to the peripheral area, and the second depth is greater than the first depth.

26. The light guide plate as claimed in claim 25, wherein each adjacent two of the prism microstructures on the bottom surface are spaced from each other.

27. The light guide plate as claimed in claim 25, wherein the top angle $\theta_1$ of each of the first prism microstructures is between 85 and 105 degrees.

28. The light guide plate as claimed in claim 25, wherein the light emitting surface further has a buffer area between the central area and the peripheral area, and the prism microstructures on the light emitting surface further comprise a plurality of third prism microstructures located in the buffer area and a top angle of each of the third prism microstructures is between $\theta_1$ and $\theta_2$.

29. The light guide plate as claimed in claim 28, wherein the third prism microstructures are constituted by a plurality of prism microstructures having top angles $\theta_3$ and a plurality of prism microstructures having top angles $\theta_4$, and $\theta_4$ is greater than $\theta_3$.

30. The light guide plate as claimed in claim 29, wherein a distribution density of the prism microstructures having top angles $\theta_4$ in the buffer area gradually increases from the central area towards the peripheral area.

31. The light guide plate as claimed in claim 28, wherein the top angles of the third prism microstructures gradually increase from the central area towards the peripheral area.

32. The light guide plate as claimed in claim 25, wherein the prism microstructures on the light emitting surface further comprise a plurality of third-prism microstructures located in the peripheral area, and a top angle of each of the third prism microstructures is between $\theta_1$ and $\theta_2$.

33. The light guide plate as claimed in claim 25, wherein the triangular prisms on the light emitting surface are substantially perpendicular to the V-shaped trenches on the bottom surface.

34. The light guide plate as claimed in claim 25, wherein at least one of the side surfaces serves as a light introducing surface, and a distribution density of the prism microstructures on the bottom surface gradually increases along a direction away from the light introducing surface.

35. The light guide plate as claimed in claim 25, wherein at least one of the side surfaces serves as a light introducing surface, and a height or depth of the prism microstructures on the bottom surface gradually increases along a direction away from the light introducing surface.

36. The light guide plate as claimed in claim 25, wherein at least one of the side surfaces serves as a light introducing surface, and an extending direction of a normal of the light introducing surface is substantially parallel to an extending direction of the prism microstructures on the light emitting surface.

37. A backlight module, comprising:
   a light guide plate, comprising:
      a body having a bottom surface, a light emitting surface opposite to the bottom surface, and a plurality of side surfaces connected between the bottom surface and the light emitting surface, wherein the light emitting surface has a central area and at least one peripheral area disposed thereon, and the peripheral area is located outside the central area;
      a plurality of prism microstructures disposed on the light emitting surface and the bottom surface, wherein the prism microstructures on the light emitting surface comprise a plurality of first prism microstructures located in the central area and a plurality of second prism microstructures located in the peripheral area, and a top angle $\theta_2$ of each of the second prism microstructures is greater than a top angle $\theta_1$ of each of the first prism microstructures, wherein the prism microstructures on the light emitting surface comprise a plurality of triangular prisms arranged in parallel to each other, the prism microstructures on the bottom surface comprise a plurality of V-shaped trenches arranged in parallel to each other, and relative to the bottom surface, the V-shaped trenches on the bottom surface have a first depth corresponding to the central area and a second depth corresponding to the peripheral area, and the second depth is greater than the first depth; and
   a light source set located by at least one side surface of the body for emitting a light into the body via the at least one side surface.

38. The backlight module as claimed in claim 37, wherein each adjacent two of the prism microstructures on the bottom surface are spaced from each other.

39. The backlight module as claimed in claim 37, wherein, on a projection plane parallel to the light emitting surface, an extending direction of the light source set is substantially perpendicular to an extending direction of the prism microstructures on the light emitting surface.

40. The backlight module as claimed in claim 37, wherein a top angle $\theta_1$ of each of the first prism microstructures is between 85 and 105 degrees.

41. The backlight module as claimed in claim 37, wherein the light emitting surface further has a buffer area between the central area and the peripheral area, and the prism microstructures on the light emitting surface further comprise a plurality of third prism microstructures located in the buffer area and a top angle of each of the third prism microstructures is between $\theta_1$ and $\theta_2$.

42. The backlight module as claimed in claim 41, wherein the third prism microstructures are constituted by a plurality of prism microstructures having top angles $\theta_3$ and a plurality of prism microstructures having top angles $\theta_4$, and $\theta_4$ is greater than $\theta_3$.

43. The backlight module as claimed in claim 42, wherein a distribution density of the prism microstructures having top angles $\theta_4$ in the buffer area gradually increases from the central area towards the peripheral area.

44. The backlight module as claimed in claim 41, wherein the top angles of the third prism microstructures gradually increase from the central area towards the peripheral area.

45. The backlight module as claimed in claim 37, wherein the prism microstructures on the light emitting surface further comprise a plurality of third prism microstructures located in the peripheral area, and a top angle of each of the third prism microstructures is between $\theta_1$ and $\theta_2$.

46. The backlight module as claimed in claim 37, wherein the triangular prisms on the light emitting surface are substantially perpendicular to the V-shaped trenches on the bottom surface.

47. The backlight module as claimed in claim 37, wherein at least one of the side surfaces serves as a light introducing surface, and a distribution density of the prism microstructures on the bottom surface gradually increases along a direction away from the light introducing surface.

48. The backlight module as claimed in claim 37, wherein at least one of the side surfaces serves as a light introducing surface, and a height or depth of the prism microstructures on the bottom surface gradually increases along a direction away from the light introducing surface.

* * * * *